US012215652B1

United States Patent
Keller et al.

(10) Patent No.: US 12,215,652 B1
(45) Date of Patent: Feb. 4, 2025

(54) METHOD FOR MAKING A LIGHTWEIGHT INTERNAL COMBUSTION ENGINE PISTON WITH MICRO CHAMBERS

(71) Applicant: Michael I. Keller, Alexandria, VA (US)

(72) Inventors: Michael Ira Keller, Alexandria, VA (US); Andrew E. Meyer, Harpers Ferry, WV (US); William R. Bandy, Gambrills, MD (US); Sidney Lynn Reed, Lynchburg, VA (US)

(73) Assignee: Lean-Burn Combustion, Inc., Alexandria, VA (US)

( * ) Notice: Subject to any disclaimer, the term of this patent is extended or adjusted under 35 U.S.C. 154(b) by 0 days.

(21) Appl. No.: 18/445,812

(22) Filed: Feb. 15, 2024

Related U.S. Application Data

(60) Provisional application No. 63/576,531, filed on Feb. 16, 2023.

(51) Int. Cl.
| | |
|---|---|
| *B23P 15/10* | (2006.01) |
| *F02F 3/26* | (2006.01) |
| *F02F 3/28* | (2006.01) |
| *F02F 3/00* | (2006.01) |

(52) U.S. Cl.
CPC ............... *F02F 3/26* (2013.01); *B23P 15/10* (2013.01); *F02F 3/28* (2013.01); *F02F 2003/0061* (2013.01); *Y10T 29/49249* (2015.01)

(58) Field of Classification Search
CPC ... B23P 15/105; B23P 15/10; Y10T 29/49249
See application file for complete search history.

(56) References Cited

U.S. PATENT DOCUMENTS

| | | | | |
|---|---|---|---|---|
| 4,340,019 A | * | 7/1982 | Barnert | F02B 19/14 123/270 |
| 8,443,716 B2 | * | 5/2013 | Keller | F02B 3/02 92/213 |

* cited by examiner

*Primary Examiner* — Sarang Afzali
(74) *Attorney, Agent, or Firm* — BACON&THOMAS,PLLC

(57) ABSTRACT

An automotive internal combustion engine piston is formed to have a bowl in the piston crown, at least one micro chamber formed in a side surface of the piston body at a position lower than a floor of the bowl, and extended orifices to provide 2-way communication of gaseous materials between the micro chambers and bowl. The micro chamber volume is defined by a removable casting core that incorporates a strut to secure the core at the circumference of the piston body in the casting mold. Subsequent to casting and removal of the core material, the cavity from the strut to secure the core is prepared to receive a tapered thread plug that is sealed by circumferential friction stir welding on the outer diameter of the piston body. The micro chamber is thereby isolated except for the extended orifice to the bowl.

10 Claims, 8 Drawing Sheets

METHOD FOR MAKING A LIGHTWEIGHT INTERNAL COMBUSTION ENGINE PISTON WITH MICRO CHAMBERS

BACKGROUND

Climate Change is presenting challenging issues that are having a major impact on the automotive sector of the world economy. International automotive manufacturing is being pushed to eliminate the internal combustion engine and to aggressively transition to battery powered vehicles. The consumer is faced with a major investment decision when the time comes to buy a new vehicle. Significantly, U.S. annual new vehicle sales of 12 to 15 million clearly show a nearly 90 percent majority of purchasers prefer gasoline-powered vehicles. Extant governmental policies at the national and state levels are promulgating higher fuel mileage and emissions reduction standards and offering tax incentives to encourage sales of battery powered vehicles. Notwithstanding, some in the automotive industry assess this issue by reducing commitments to increased battery powered vehicle production capacity and projection statements: "10 years from now 80 percent of the cars on the road worldwide will still use gasoline".

The present invention is a response to the need to transform internal combustion engine combustion performance to improved fuel economy and reduce emissions. Today's gasoline direct injection (GDI) automotive engines are based on a piston weight in the range of 338 grams. The prior art lean-burn piston cannot be reduced to that weight range by modifying the dimensions of the enabling embodiments in the piston crown. The present lightweight chemistry producing piston locates improved embodiments of the prior art to the piston body, below the bowl floor, in an arrangement limited by the outside diameter of the piston. This invention enables significant reconfiguration of the bowl diameter, bowl profile, bowl depth and addition of a "bump-in-the-floor" (known as a pip) and presents the piston at 338 grams. Further, improved and new embodiments of the present piston address the need to improve environmental quality by reducing smog producing NOx emissions, very low hydrocarbons and "cold-start" ultra-fine particulates. The present invention is a major advancement over the prior art piston described in U.S. Pat. No. 8,443,716, incorporated in its entirety.

SUMMARY OF THE INVENTION

Limitations of the prior art piston embodiments preclude optimization of the bowl (125) diameter and bowl depth for a required bowl volume to assure a combustion compression ratio of 12.5 to 1 for an objective auto-ignition engine. Additionally, increasing the bowl diameter in the prior art piston is limited by the need for adequate aluminum between the embodiments and ring grooves to assure integrity of the piston in the rigors of engine operation. The present piston invention reduces the weight of the piston crown (100) by: (1) locating the micro chamber (200) below the floor of the bowl (140) and (2) a present threaded taper plug embodiment (460) on the circumference to be sealed and secured with circumferential friction stir welding (515). The present piston provides a bowl diameter increase of 0.414 in. and a depth decrease of 0.233 in. compared to the prior art piston. Said dimensions reduce the amount of cast aluminum in the piston crown by 60 grams. Further, this present piston bowl configuration improves compression stroke gasoline-air mixing by including a pip (175) in the floor of the bowl to optimize tumble for air turbulence to improve a stratified charge mixture for combustion.

It is appreciated that weight of a piston in engine design has a major impact on rotational and reciprocating forces that impact the weight of the piston wrist pin, connecting rod, crankshaft and flywheel. State-of-the-art lightweight engine design is exemplified by the 4-cylinder, 2-liter Prius gasoline engine weighing slightly under 300 pounds.

The present micro chamber (200) is sealed with a present tapered thread plug (460) on the circumference of the present piston after the piston body has progressed through post-casting operations. This plug (460) embodiment is subsequently secured and sealed by the circumferential friction stir welding (515) embodiment.

In sum, the present piston invention is a disruptive technology with potential for significant impact in responding to the automotive Climate Change challenging issue.

DISCUSSION OF THE DRAWINGS

Examples of the present lightweight piston having a central bowl and micro chambers according to embodiments of the invention will be explained in more detail with reference to the drawings, wherein.

Figure 2A:
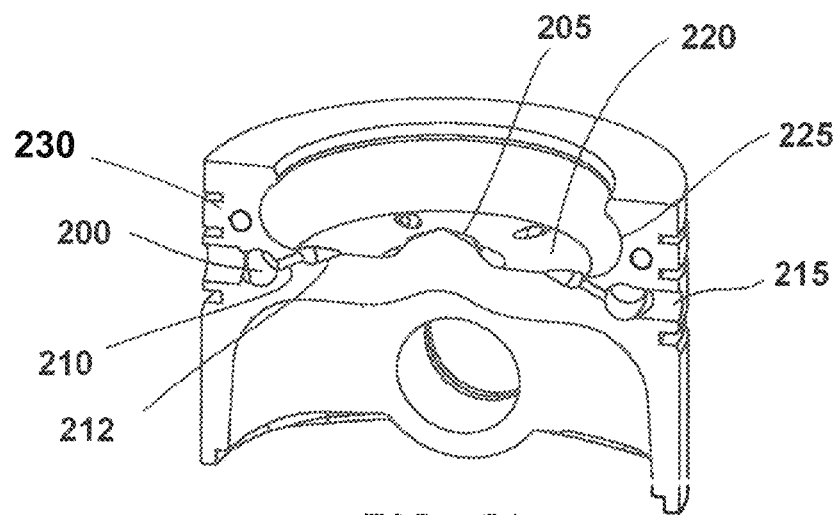
Figure 2B:
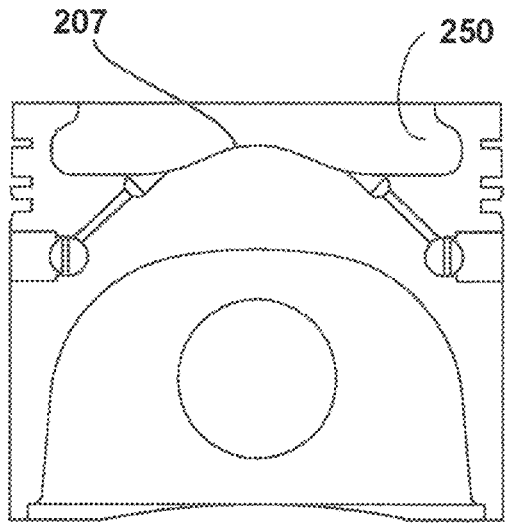
Figure 2C:
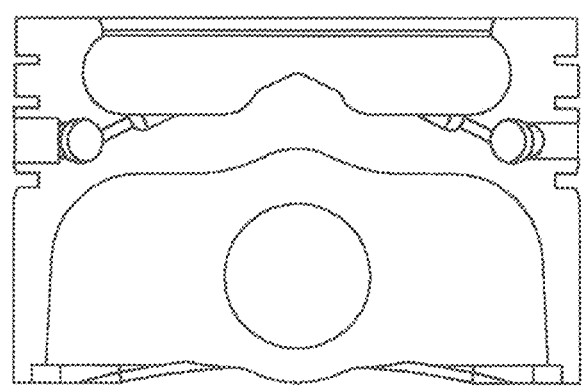

FIG. 2A is the present lighter weight piston arrangement of the present micro chamber (200) embodiment below the floor of the piston bowl to enable piston crown optimization that includes an enhanced pip (205) to enhance gasoline-air mixing FIG. 2B is the present piston to achieve maximum weight reduction but is unsatisfactory as the embodiments are inadequate to manage intake air flow and tumble to optimize gasoline-air mixing to form a stratified in-cylinder charge. The inadequate pip (207) in the floor of the bowl does not provide an alternative to an optimized bowl configuration;

FIG. 2C is a cross sectional view of a 92 mm cylinder bore version of the piston arrangement of FIG. 2A.

Figure 3A:
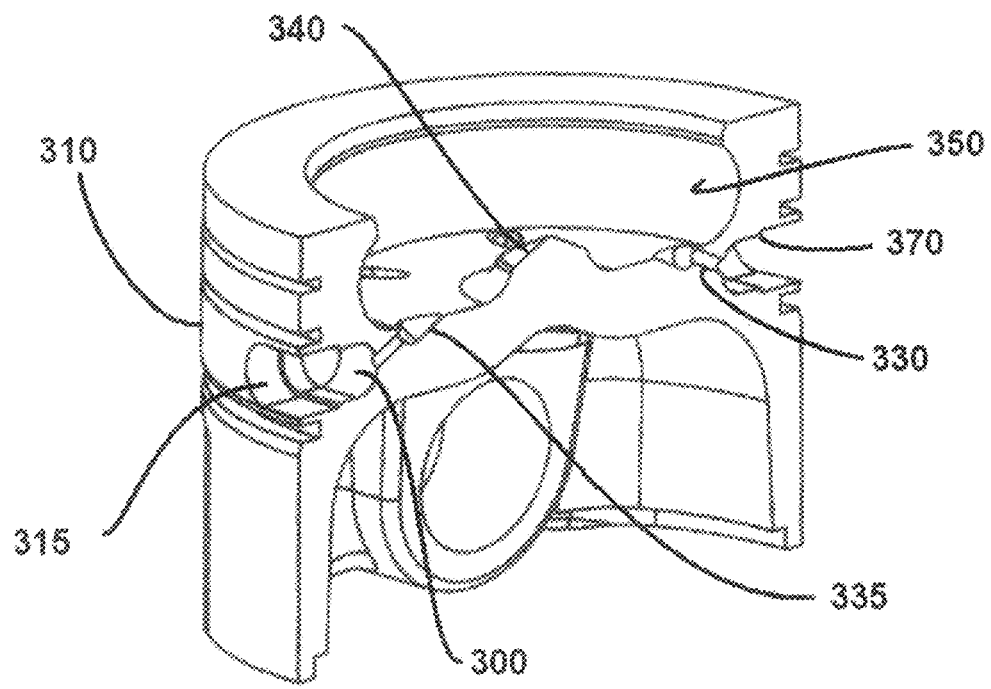

FIG. 3A is the present piston manufactured by machining a piston blank and incorporating a present shaped access hole (315) to define the machined micro chamber (300) volume.

Figure 3B:
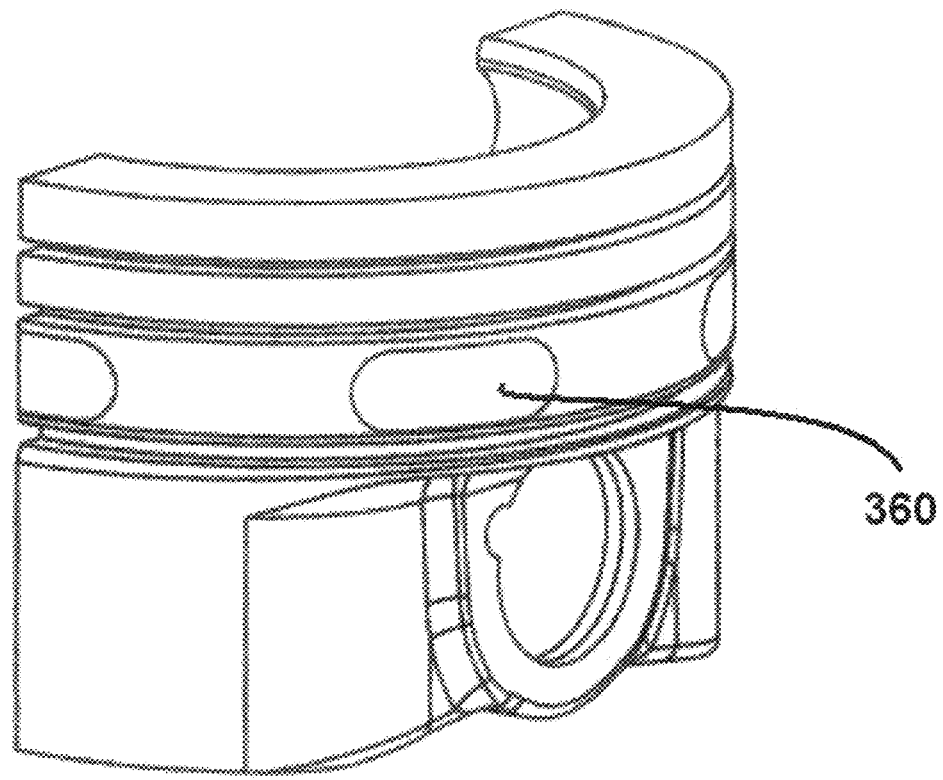
Figure 4A:
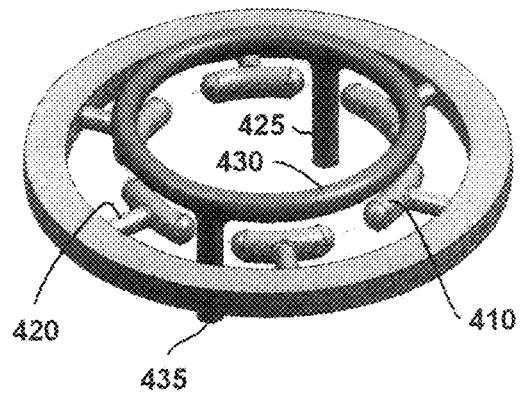
Figure 4B:
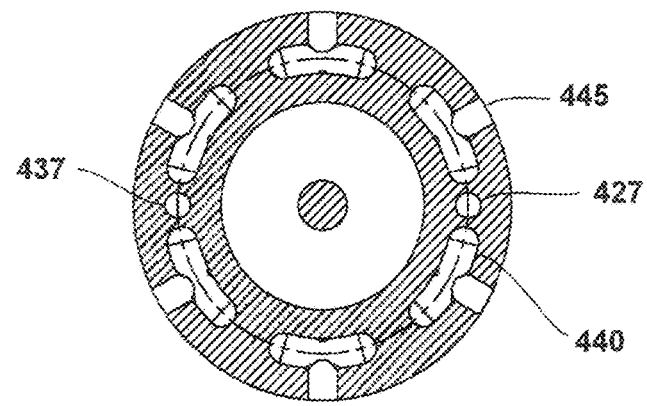
Figure 4C:
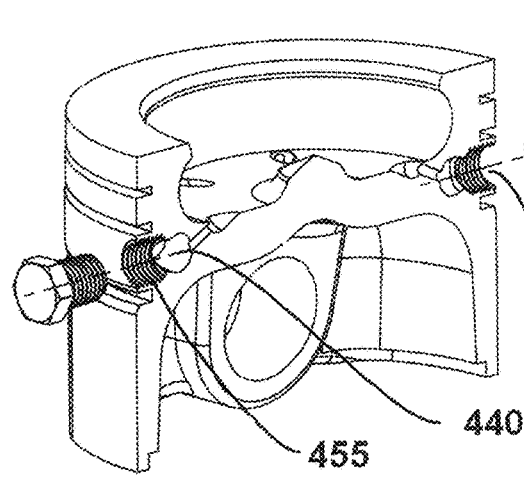
Figure 4D:
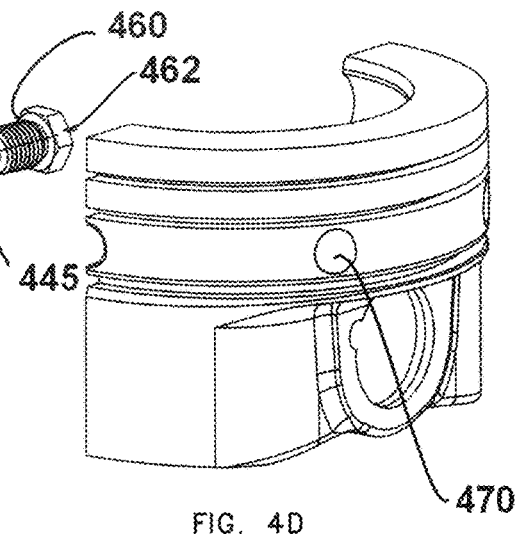
Figure 5A:
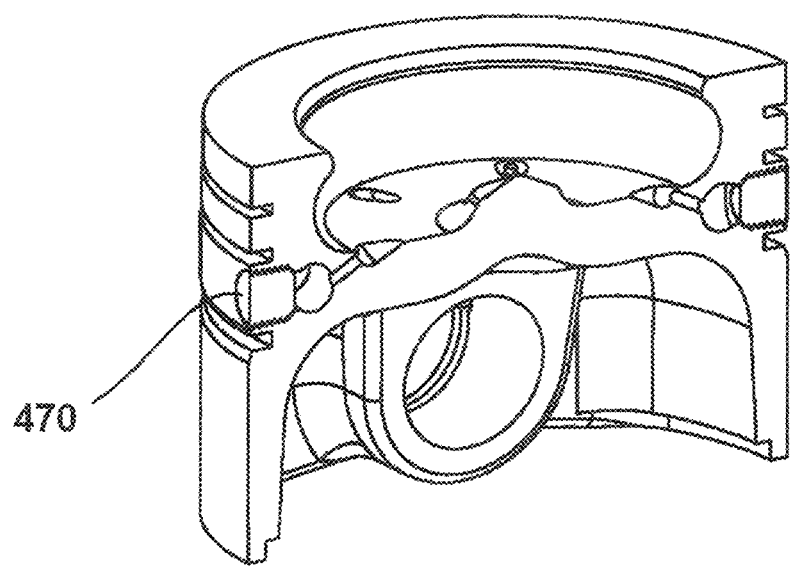
Figure 5B:
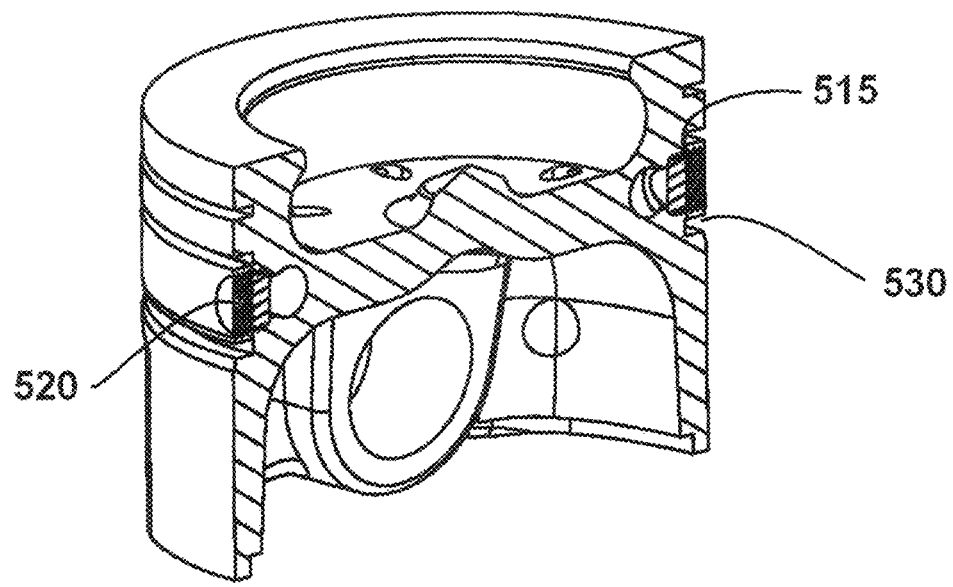
Figure 6A:
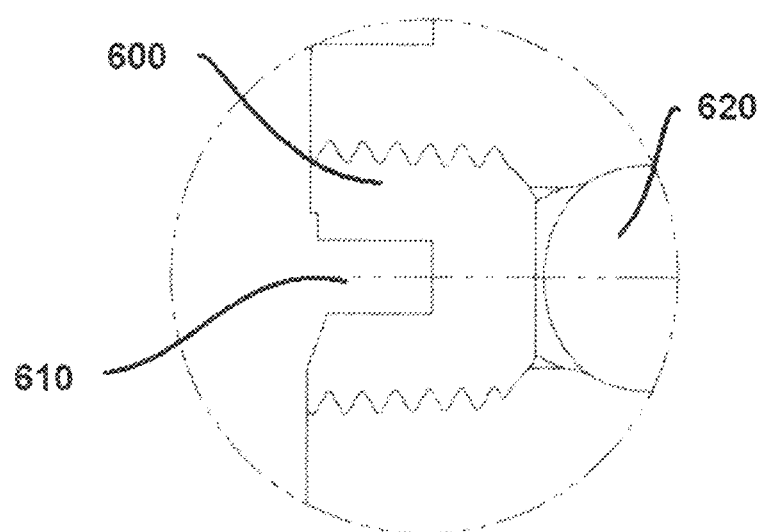
Figure 6B:
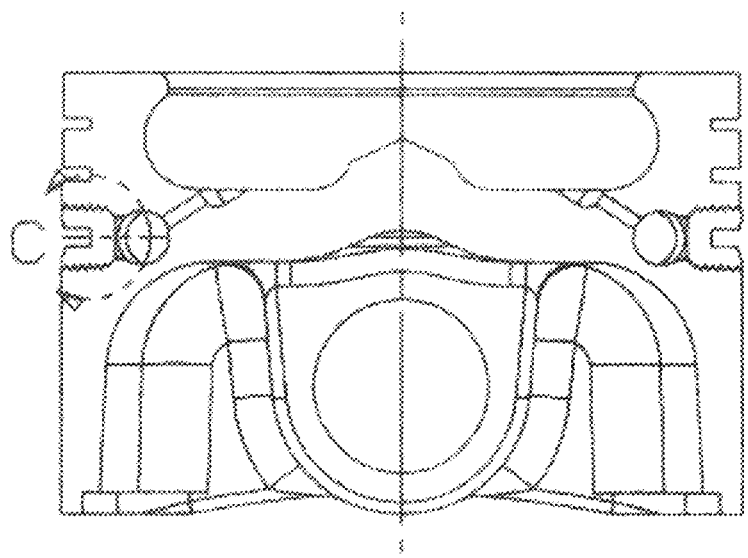

FIG. 3B is the present piston blank showing the present shaped plug (360) press-fit prior to circumferential friction stir welding;

FIG. 4A is the present core structure that consists of casting cores for a cast micro chamber (410), that integrates a passage (425) for delivery of cooling oil to the crown of the piston, a return oil passage (435), an oil gallery (430), and a casting core strut (420) to support the micro chamber core. This strut feature ultimately provides an acceptance hole to be tapered thread for reception of the tapered thread plug embodiment;

FIG. 4B is a cross section showing the resultant cast-in micro chamber (440), cooling oil passages (427 and 437) and holes (445) to be tapered threaded for the tapered thread plug of the present piston;

FIG. 4C is the present piston blank manufactured by casting for assembly with the present tapered thread plug (460) incorporating an external hex head (462) for tightening the plug;

FIG. 4D is the present piston blank with plug hex head embodiment removed and machined (470) to prepare the circumferential friction stir welding path;

FIG. 5A is a view of the piston blank with the tapered thread plug in place and machined (470) in preparation for circumferential friction stir welding;

FIG. 5B shows the structure of the desired welding outcome;

FIG. 6A is an alternative embodiment that eliminates the circumferential friction stir welding by incorporating a larger diameter tapered thread plug (600) and provision for an oil ring groove (610);

FIG. 6B shows the alternative embodiment in the piston.

Figure 7A:
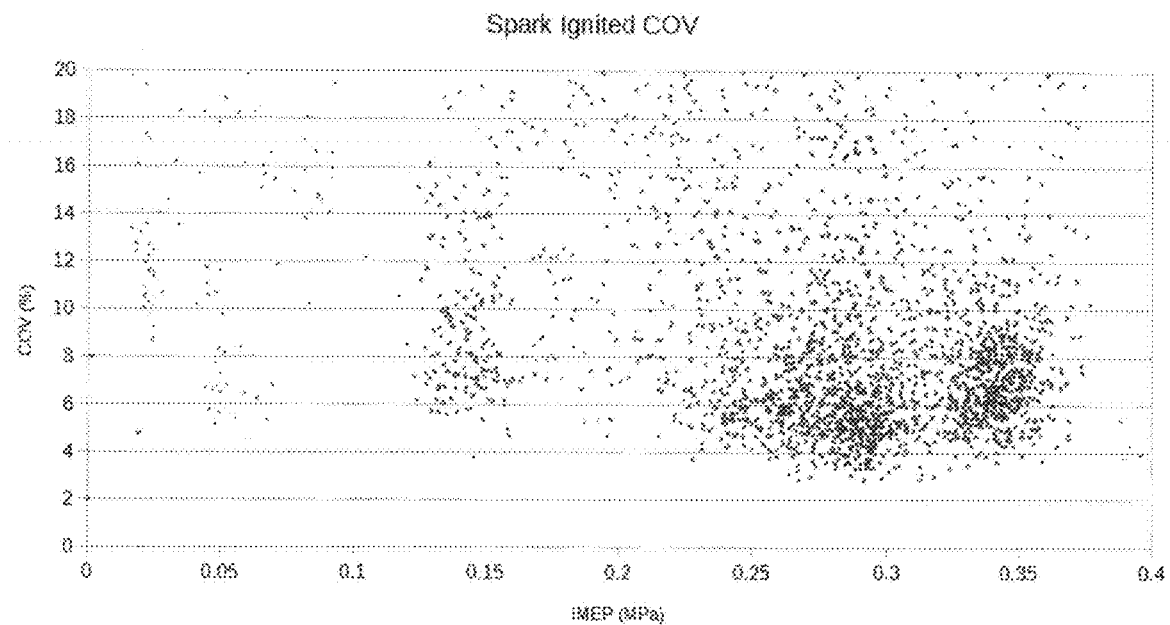
Figure 7B:
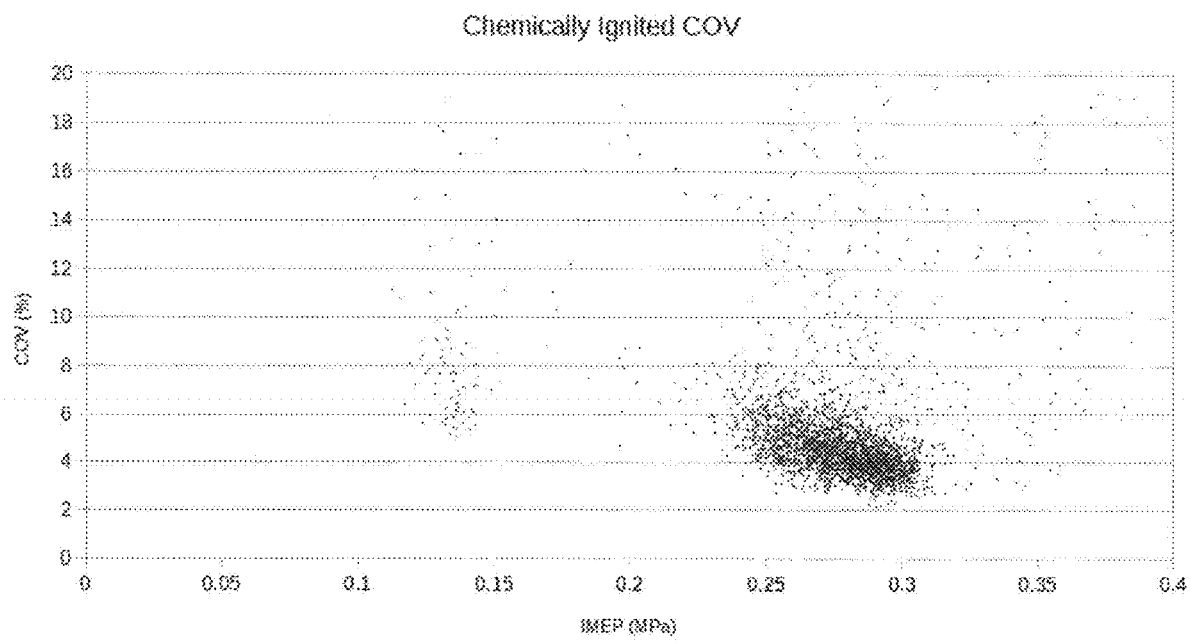
Figure 8A:
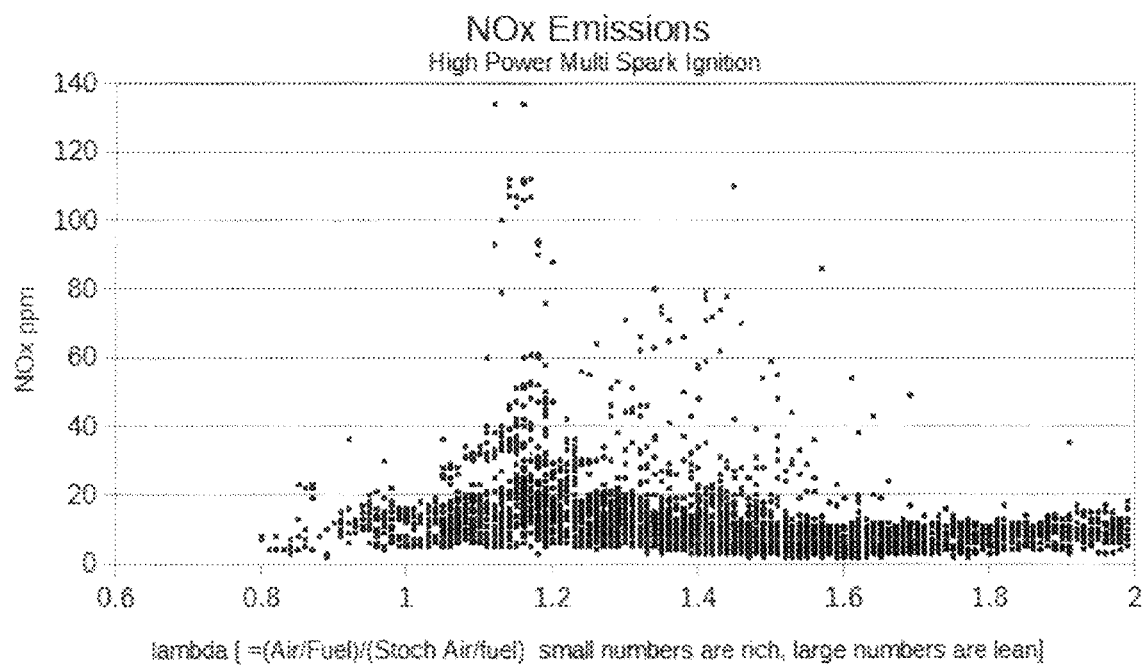
Figure 8B:
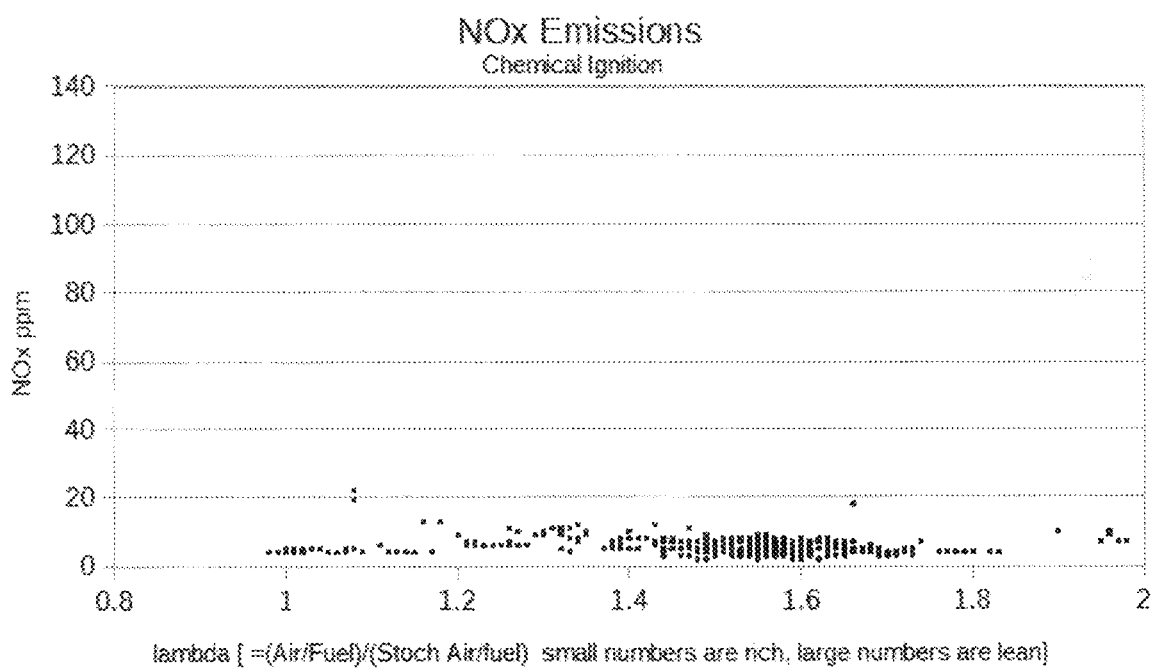

FIG. 7A is a data plot of measured coefficient of variability (COV) of spark ignited, lean flame front combustion;

FIG. 7B is a data plot of measured coefficient of variability (COV) of chemically ignited lean-burn volumetric combustion;

FIG. 8A is a data plot of measured NOx emissions of spark-ignited lean flame front combustion;

FIG. 8B is a data plot of measured NOx emissions of the present auto-ignition and volumetric lean-burn combustion.

DETAILED DESCRIPTION

Figure 1A:
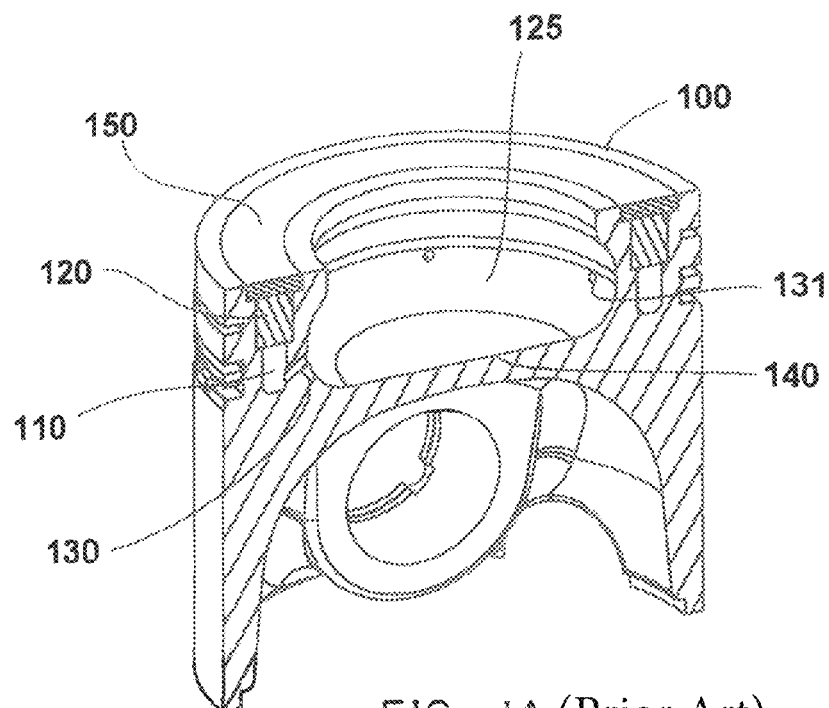
FIG. 1A is a schematic view of the prior art piston arrangement of embodiments above the floor of the bowl.
Figure 1B:
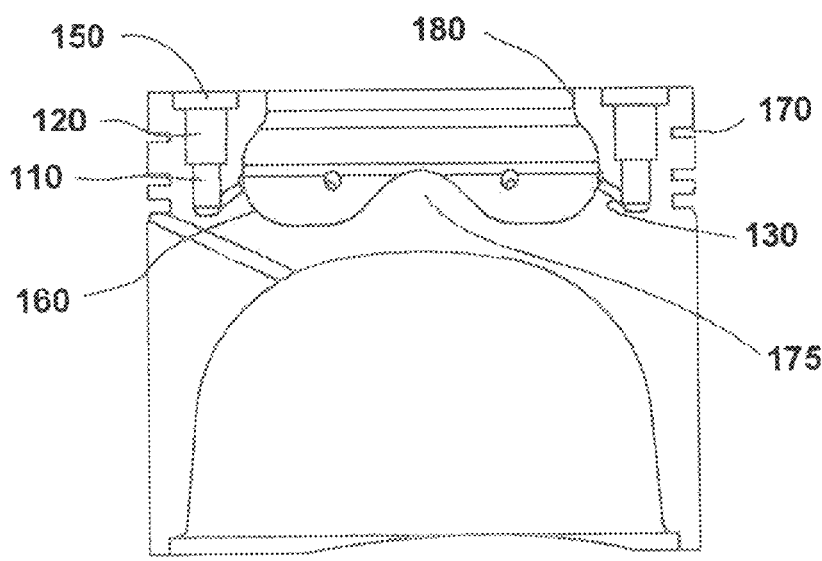
FIG. 1B shows less than adequate optimization of the prior art due to constraints in bowl diameter, bowl depth and bowl sidewall profile.embodiments with no reduction in piston weight.

The prior art internal combustion engine piston crown (100) in FIG. 1A) arranges the prior micro chamber (110), plug (120), bowl profile (125), and orifice (130) and orifice opening (131) above the bowl floor (140). The prior art orifice opening (131) intercepts the injected gasoline spray during a very short duration intersection of the small diameter orifice entrance (131) (defined by the orifice diameter). The prior art friction stir welding is shown as (150). FIG. 1B shows the prior art overall sidewall profile (160) cannot be fully optimized due to proximity of the arrangement to the top ring groove (170). The addition of a pip (175) to enhance gasoline-air mixing to produce a stratified charge is insufficient without improvement of the overall bowl sidewall profile (160). Further, it is not possible to integrate an oil gallery in the piston crown to optimize cooling in the region of the bowl entrance (180). Thus, the prior art arrangement permits only limited inadequate optimization with a non-variable bowl compression volume required to maintain a 12.5 to 1 compression ratio.

The arrangement of the present lightweight chemistry producing piston, shown in FIG. 2A locates the micro chamber (200), orifice (210), orifice opening (212) and present plug (215) below the bowl floor (220). The present circumferential friction stir welding embodiment (530 FIG. 5) is located below the bowl floor. This arrangement enables optimization of the bowl diameter, bowl depth, bowl sidewall profile (225) and pip (205). This arrangement yields a piston crown weight reduction of 60 grams. The weight of the present piston at 338 grams provides a piston advancement for 2-liter, 4-cylinder GDI engines. FIG. 2B shows an arrangement that enables a greater weight reduction of the present piston, but is not optimum because intake air flow (250), and gasoline-air mixture formation cannot be optimized. The minimum pip (207) does not adequately improve the gasoline-air mixture formation. Further, there is insufficient space for the oil gallery (230) in the piston crown. FIG. 2C shows the present piston embodiments can be scaled for an engine with a 92 mm cylinder bore.

The present piston provides an improved orifice (210) which is a common element in the machined and cast descriptions provided below. The present orifice incorporates a flared entrance (212) to extend the intercept time of the gasoline spray without increasing the diameter of the orifice. Delivery of gasoline into the micro chamber is enhanced by rising compression stroke air pressure. This present flared entrance embodiment is located in a fuel rich region of the bowl to further assure the requisite rich mixture in the micro chamber is attained over the full speed range of the objective engine.

The present orifice embodiment (210) provides the means for suppression of bowl flame propagation to the micro chamber (200). Bowl flame propagation is suppressed by extraction of flame energy due to the length and temperature of the wall of the present orifice. In the prior art the orifice (130) is located in a very hot portion of the piston crown which reduces energy extraction. The location of the present orifice (210) in a lower temperature region below the bowl floor enhances energy extraction. The concept of energy extraction to prevent flame propagation was invented in 1815 by Sir Humphrey Davy in England for illumination on coal miners' helmets. His invention placed a mesh screen around the flame on a wick. The very small holes in the screen allowed light to pass through and contained the wick flame that would have otherwise ignited methane in the coal miners' work area! In the present piston the orifice is characterized by the ratio of the orifice length to its diameter, wherein a ratio of up to 6 to 1 is achieved.

Manufacture

The present lightweight chemistry producing piston can be manufactured using industrial casting and machining processes.

Machined Manufacture:

The present piston blank shown in FIG. 3A is utilized in a machining sequence to form the machined micro chamber (300) from the outside diameter (310) of the piston. The access hole (315) is dimensioned as required to form the machined micro chamber (300). The present increased length orifice (330) and orifice entrance (335) are machined and inspected. The machined pip (340) is more effective in concert with the optimized bowl profile (350). FIG. 3B shows the present shaped plug (360) press-fit against a supporting shoulder (370 in FIG. 3A) in the piston body. This shaped plug configuration is subsequently circumferential friction stir welded into place. The feasibility of circumferential friction stir welding technology to secure the shaped plug on the outside diameter of the present piston has been demonstrated using 4032 aluminum piston alloy in a T6 condition The present lightweight piston blank shown in FIG. 3A has been heat treated to T6 condition prior to machining. Pre-weld machining on the present piston blank forms all the embodiments and allows the inspection of the embodiments. The finished bowl, orifice and bowl sidewall are shielded by appropriate means during the circumferential friction stir welding process. FIG. 3B shows the present shaped plug (360) press-fit in preparation for circumferential friction stir welding. The final step is finish machining to achieve the required external close tolerances of the present piston.

Cast Manufacture:

The present lightweight aluminum alloy cast piston blank is manufactured using a 2-piece core structure as shown in FIG. 4A. The micro chamber core (410) and support strut (420) comprise one core. The second core integrates features for forming three cast passages; to deliver cooling oil (425) to the cooling gallery (430) and a return of the cooling oil (435). Once the casting has cooled the embedded core material is extracted via the cleared strut. FIG. 4B is a piston cross section showing the resultant cast micro chamber (440). The cleared strut portion (445) is a hole to be taper tapped (455 FIG. 4C) after the entire casting has been heat treated to a T6 temper. Said thread feature is used in the assembly process to accept the threaded taper plug embodiment (460)

The present lightweight cast piston employs a preferred plug embodiment based on a taper threaded plug (460) to be installed in the prepared cast piston body to seal the micro chamber (440). Said plug is formed of T6 tempered aluminum alloy which is readily machined and compatible with the circumferential friction stir welding process. A moderately-torqued plug of an NPTF dry seal plug taper thread embodiment is used to create high pressure gas tight seal. The preferred threaded taper plug embodiment uniquely provides an external hexagonal head feature (462) to apply a socket or similar tool for grasping and turned to the required torque-in value. An off-the-shelf, commercially available NPTF plug with an internal receiving feature in the body of the plug for engagement of a male driving socket or the like to secure the plug should not be used. An internal hexagonal feature would leave a series of shallow recesses that would be difficult to fill during the circumferential friction stir welding embodiment. Said recesses would hinder placement of an oil ring groove on the piston crown.

As shown in FIG. 4D the present external hexagonal head plug feature (462) has been removed and machined flush (470) with the present cast piston blank body prior to circumferential friction stir welding. When the present circumferential friction stir welding embodiment (FIG. 5B 520) is completed the stir welding tool is directed to an offset location for withdrawal to leave an inconsequential dimple.

It has been determined that the present NPTF plug embodiment can be permanently secured with a circumferential friction stir welding Z force (normal to the plug axis) of 300 pounds at 1,800 RPM. The tapered plug profile embodiment enhances support of the present plug due to the wedged engagement with the piston body. The present plug has withstood a circumferential friction stir welding Z force of 900 pounds without any movement of the plug toward the micro chamber. It has been determined that this application of circumferential friction stir welding results in a narrow heat affected zone which preserves the piston body T6 hardness for the placement of a typical oil ring groove (530). The desired T6 temper of the oil ring groove suppresses premature ring groove wear to thwart ring distortion or twisting to avoid a major engine failure. FIG. 5A shows the present threaded taper plug (470) prepared for circumferential friction stir welding. FIG. 5B shows the homogenation of the tapered thread plug and the piston body and the narrow heat affected zone (515). The tapered thread plug and circumferential friction stir welding the plug have a preferred weld depth of 0.125 in. on a threaded plug depth of 0.250 in.

Friction stir welding procedures are known to those in the art that will permit a person skilled in the art of friction stir welding to make and use the present embodiment without extensive experimentation.

Alternative Embodiment

FIG. 6A is an alternative embodiment based on securing a larger diameter plug (600) in the cast piston body (as described above) to eliminate the circumferential friction stir welding and increasing the retention torque of the NPTF plug. In this alternative embodiment, retention torque is specified to assure the NTPF dry seal, rated at up to 5,000 psi, is not broken under engine operating conditions over the life of the objective engine. It has been determined that application of a cleaning fluid such as hexamethyldisiloxane to said tapered threaded plug and aluminum piston body receiving threads improves metal to metal contact by galling (also known as cold welding) which enhances the rated sealing pressure. This alternative embodiment employs the galling contact to increase retention torque. For example, installing an NPTF aluminum plug into a T6 tempered aluminum piece to 90 in-lb, then oscillating the plug back and forth about 60 degrees creates a retention torque of 190 inch pounds.

As shown FIG. 6A this alternative embodiment affords the opportunity to use a larger diameter present tapered threaded plug (600) with a thread-in depth of 0.392 in. The larger diameter threaded tapered plug in T6 temper in this alternative embodiment provides greater design flexibility for placing and machining an oil ring groove (610) (nominally 0.083 in. high) through the diameter of the plug. FIG. 6B shows the plug of this arrangement in relation to the micro chamber (620).

Chemistry System

The chemistry system can be traced to the groundbreaking hydrocarbon branching and radical creation work of Dr. Nikolay N. Semenov, a Russian scientist (Apr. 15, 1896-Sep. 25, 1986). He won a Nobel Prize in chemistry in 1956 for his research in the mechanism of chemical transformation, molecular chain theory and negative temperature coefficient for chemical reaction. His work provides the basis for degenerate branching theory to understand hydrocarbon combustion.

The chemistry of hydrocarbon fuels is well documented over many years in the literature (see ref. 2) on exacting experiments and robust simulation. Major advances in this area were the subject of investment by the U.S. Department of Energy and a major advancement was presented in 1985 when the KIVA simulation technology was introduced. The computer resource needed to apply KIVA was in the range of a super computer. Considerable effort and private investment has brought the simulation technology forward with in-the-cloud computing. The present chemistry system addressed at present is based on n-heptane oxidation and "low temperature cool flames" as mechanised in the present micro chamber and bowl in an objective 4-cycle engine. Oxidation of n-heptane is the starting point for a complex progression of chemistry. Low temperature cool flames are a precursor to auto-ignition intermediates. The present chemistry system in the present invention exhibits time-temperature-pressure steps at a 12.5 to 1 compression ratio that lead to auto-ignition. The chemistry system mechanized by all prior art and present piston provide a chemistry carry-over in the micro chamber for the next combustion cycle. An outline of the chemistry system for a 4 cycle engine is as follows:

1, Compression Stroke: Timed, multi-pulse gasoline injection below top-dead-center of this stroke delivers to the micro chamber approximately 1% of the overall fuel charge per combustion event. Said delivery is aided by the rising cylinder compression pressure via the present orifice entrance (212) and present orifice embodiment (210).

2. Power Stroke: The auto-ignition event, shortly after top-dead-center of the compression stroke, is followed by high rate of heat release low temperature volumetric lean-burn combustion. The rising combustion temperature-pressure profile is impressed upon the n-heptane in the micro chamber to initiate n-heptane oxidation and the chemical sequence that produces carry-over auto-ignition intermediates for the next combustion cycle. This initial sequence produces precursors for cool flames in the micro chamber. Cool flame chemistry is unique as it exhibits a negative temperature coefficient of chemical reaction on some components of the complex gasoline makeup. The negative temperature coefficient slows chemical reactions and prevents a combustion event in the micro chamber. During the short period of cool flames the essential chemical intermediate formed is formaldehyde. The temperature of the mixture in the micro chamber is further reduced as the piston moves down in the power stroke. The resultant lowered temperature in the micro chamber prevents auto-ignition in the micro chamber. One of the intermediates in the micro chamber is hydrogen peroxide. As the bowl pressure of the power stroke drops further, some of the intermediate chemistry in the micro chamber is expelled until the micro chamber and bowl pressures equalize. This expulsion of ignition aids into the bowl enhances combustion which is effective in consuming soot and ultra-fine particulate.

3. Exhaust Stroke: When the exhaust valve opens there is a further reduction of the cylinder pressure acting on the micro chamber which causes additional intermediate products to be expelled into the bowl. Sufficient chemistry is retained in the micro chamber and bowl by closure of the exhaust valve.

4. Intake Stroke: The intake valve opening is delayed by 15 degrees of crankshaft rotation to create a negative pressure in the cylinder causing further expulsion of remaining chemical species of hydrogen peroxide, formaldehyde and carbon monoxide. These intermediates fumigate the incoming air and the intake valve is closed.

5. Peak of Compression Stroke: The piston rises in the compression stroke, inherently raising cylinder temperature of the contained air and chemical species. The formaldehyde-hydrogen peroxide chemistry is rapidly transformed to two OH auto-ignition radicals. OH radicals have been shown to be very effective auto-ignition aids and frequently reported in the literature. The transformation of weak-bonded hydrogen peroxide to two OH radicals is a highly exothermic process providing an additional 300 deg. C rise. OH radicals are powerful oxidation agents, (exceeding atomic oxygen) and are an excellent means for causing a reliable auto-ignition step in the present chemistry process at a 12.5 to 1 compression ratio.

Performance

There are many technical means to describe performance of a 4-cycle internal combustion engine. The information presented in FIG. 7 and FIG. 8 are significant measures to "qualify" a major advancement in the gasoline combustion process. This data on low temperature lean-burn combustion reflects operation with preferred excessive intake air, which also reduces pumping loss (negative work) in the characterization of an engine and controlled high rate of heat release for COV measures. Further, the NOx level is the consequence of a volumetric lower combustion temperature compared to classical flame front combustion technology. High rate of heat release after top-dead-center provides a method to reduce heat loss.

COV:

It is recognized that spark-ignited, lean gasoline-air mixtures misfire and are characterized by a slow moving flame front. Thus, classical spark-ignited, slightly lean combustion is impractical in automotive engines. Further, slow combustion limits engine power with excessive unburned hydrocarbons and differences in coefficient of variability (COV) at light engine load from one engine cycle to next and is sensed by the car driver as engine roughness. The present chemistry producing piston provides embodiments for chemically driven auto-ignition and controlled lean volumetric combustion to overcome the shortcomings of spark-ignited lean combustion. FIG. 7A and FIG. 7B show COV data comparing lean spark-ignition combustion and volumetric lean, chemical auto-ignition and combustion mechanized by the present invention, where a 3% COV is a step forward for light engine load.

NOx:—Characteristics of the present multi-pulse, direct fuel injection strategy support lean auto-ignition, and volumetric lean combustion. The present mechanization limits peak cylinder pressures and temperatures to minimize NOx formation. NOx in the present lean-burn combustion is reduced as shown by FIG. 8A compared to FIG. 8B.

Cold-Start: This is a major issue of engine-out emissions (measured over the first 10-15 seconds) of the present piston are:

1) unburned hydrocarbons: 140 ppm (comparable to modern GDI engine tailpipe emissions when the engine and exhaust treatment are at operating temperature),
2) NOx: <8 ppm (3.5 times reduction from GDI tailpipe emissions),
3) CO 4%: (which is desired to light off catalysts) and
4) Ultra-fine particulates: <10M particles/cc. (represents 2.8 times reduction). When an engine is in a cold start stage and warming up on spark ignited combustion, the fuel injections are preferably timed so that fuel is not directed at the orifice entrance (212).

During the cold-start period the micro chamber expels air via the orifice entrance (212) during the reducing pressure of the cylinder during the power stroke to agitate the combustion volume to enhance the on-going combustion event to consume ultra-fine particulates. Once the present piston reaches operating temperature the fuel injection timing is adjusted such that the spray engages the orifice entrance (212) and the captured portion of the fuel is passed via the orifice (210) aided by cylinder pressure to fuel the micro chamber. The afore described present combustion and emissions characteristics are mechanised at a 12.5 to 1 compression ratio.

REFERENCES

1) U.S. Pat. No. 8,443,716
2) Quantification of OH & HO2 radicals during the low-temperature oxidation of hydrocarbons by Fluorescent Assay by Gas Expansion Technique; Marion Blocquet et al; PNAS, Dec. 10, 2013, Vol. 110, no. 50, 20014-20017

The invention claimed is:

1. A method of forming a piston for an internal combustion engine having a piston crown and piston body in which is formed at least one micro chamber for creating and supplying auto-ignition radicals from a hydrocarbon fuel to a combustion zone defined by the piston crown containing a bowl formed by a depression in the piston crown and a top side area surrounding the bowl, the method comprising the steps of:

forming the at least one micro chamber in a side surface of the piston body at a position lower than a floor of the bowl, such that the at least one micro chamber extends into the piston body and is independent of the piston crown;

forming, at another position lower than the floor of the bowl, at least one orifice in the piston body and fluidly communicating between the floor of the bowl and the at least one micro chamber; and plugging and sealing access to a defined volume of the at least one micro chamber from the side surface of the piston body.

2. The method according to claim 1 wherein the defined volume of the at least one micro chamber is independent of the top side area surrounding the bowl.

3. The method according to claim 1, wherein the step of plugging and sealing access to the defined volume of the at least one micro chamber comprises a step of permanently securing a plug in the piston body by circumferential friction stir welding.

4. The method according to claim 3, wherein the plug is a cylindrical plug that employs a tapered thread.

5. The method according to claim 3, wherein a material of the plug and a material of the piston body are identical.

6. The method according to claim 3, wherein:
the circumferential friction stir welding is carried out on the piston body, and
finishing leaves a plug surface on the a side of piston body that is flush with the side surface of the piston body.

7. The method according to claim 3, wherein a retention torque between the plug and the piston body is increased by galling.

8. The method according to claim 1, wherein the fluid communication provides suppressions of combustion flame and bowl flame propagation.

9. The method according to claim 8, wherein the orifice has a conically-shaped entrance at the floor of the bowl.

10. The method according to claim 1, wherein a pip is formed in the floor of the bowl.

\* \* \* \* \*